United States Patent [19]
Bittner et al.

[11] Patent Number: 5,678,883
[45] Date of Patent: Oct. 21, 1997

[54] MOTOR COACH LAYOUT FOR LAVATORY AND WHEEL CHAIR LIFT

[75] Inventors: Ronald B. Bittner, Winnipeg, Canada; John Cook, Ventura; Gordon Williams, Emeryville, both of Calif.

[73] Assignee: Motor Coach Industries Limited, Winnipeg, Canada

[21] Appl. No.: 559,040

[22] Filed: Nov. 15, 1995

[51] Int. Cl.⁶ ................................................. B62D 47/02
[52] U.S. Cl. ........................ 296/178; 296/24.1; 414/921
[58] Field of Search ............................. 296/24.1, 178; 414/921; 49/40, 41, 366; 4/607, 663, 664

[56] References Cited

U.S. PATENT DOCUMENTS

| | | | |
|---|---|---|---|
| 1,991,535 | 2/1935 | Austin | 296/178 |
| 3,813,836 | 6/1974 | Dielman | 49/366 |
| 4,884,767 | 12/1989 | Shibata | 296/24.1 X |
| 5,398,352 | 3/1995 | Kordelin | 4/664 X |

FOREIGN PATENT DOCUMENTS

| | | | |
|---|---|---|---|
| 895709 | 11/1953 | Germany | 296/178 |
| 292836 | 8/1991 | Germany | 4/607 |
| 143328 | 12/1953 | Switzerland | 296/178 |

OTHER PUBLICATIONS

KOS B.V. Brochure –4 pages.

*Primary Examiner*—Dennis H. Pedder
*Attorney, Agent, or Firm*—Adrian D. Battison; Murray E. Thrift

[57] ABSTRACT

A motor coach designed generally for highway travel has a passenger compartment between sides of the coach and forwardly of the rear wall of the coach and defined above a raised floor of the coach. Underneath the floor is provided an engine compartment behind the rear wheels of the coach and luggage compartment forward of the rear wheels. A lavatory compartment is located at the junction between the rear wall and one side wall and immediately forwardly of the lavatory compartment is provided a floor area on which the rear seats at that side of the coach can be moved forwardly to a stored position to form an open area of the coach aligned with a wheel chair lift mounted in the engine compartment and arranged to lift a passenger from the ground onto the floor of the coach into the area forwardly of the lavatory compartment. The lavatory compartment is modified by a double door arrangement so that the doorway at the front of the lavatory compartment can be partly opened for ambulatory passengers or fully opened for the wheelchair passenger on the floor area immediately forward of the lavatory compartment. A curtain is provided to enclose the lavatory compartment and the floor area for privacy of the wheelchair passenger when the doors are fully opened.

14 Claims, 7 Drawing Sheets

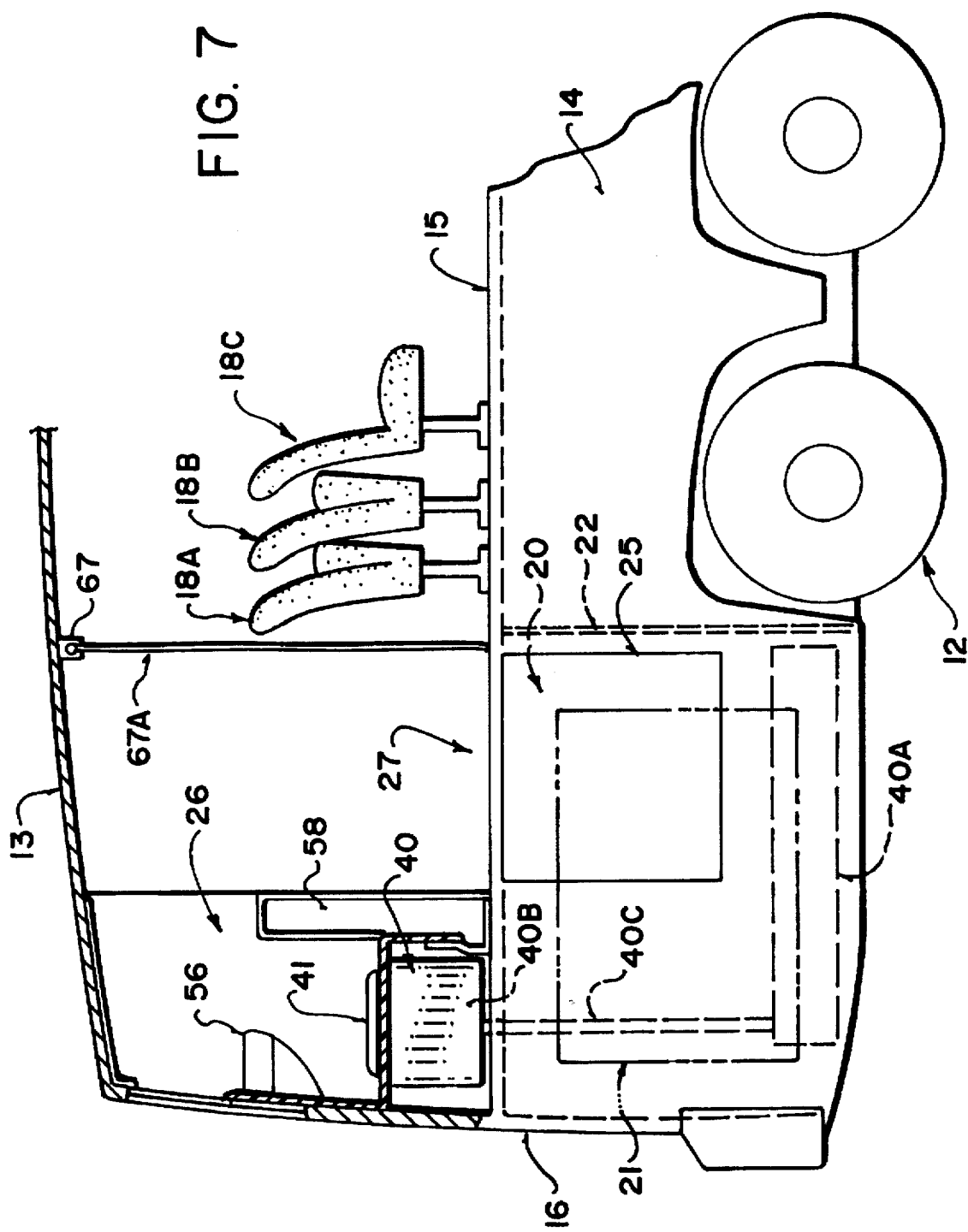

5,678,883

MOTOR COACH LAYOUT FOR LAVATORY AND WHEEL CHAIR LIFT

BACKGROUND OF THE INVENTION

This invention relates to a motor coach of the type which is generally designed for highway travel including a raised floor defining a passenger compartment above the raised floor, an engine compartment and luggage compartment underneath the raised floor and passenger seating within the passenger compartment, and more particularly relates to a layout of the coach which can accommodate most effectively a lavatory compartment and a wheelchair lift which minimizes the space requirement for these components and yet allows access to the lavatory compartment by the passenger in a wheelchair.

Conventionally the lavatory compartment for a motor coach of this type is located at one rear corner of the motor coach body. In most cases the lavatory compartment is relatively small and provides a single relatively small door which is accessible in effect only by able bodied passengers without the possibility of a wheelchair passenger accessing the lavatory compartment.

In some other cases where attempts are made to allow access to the lavatory compartment by less than able bodies persons, the lavatory compartment is significantly increased in size and requires a larger area around it to accommodate wide opening doors. This increase in size of the total area required for the lavatory compartment of course reduces the area available for conventional passenger seating thus reducing the number of fare paying passengers which can be carried.

Wheelchair lifts are well known and readily available which mount in the compartment underneath the floor and act to lift a passenger in a wheelchair from ground level at one side of the motor coach to a height equal to the floor of the motor coach so that the passenger can enter through an additional opening at the one side of the motor coach directly onto the floor at floor level. Generally the lift of this type is mounted in the luggage compartment forwardly of the rear wheels and thus must lift the passenger in the wheelchair to a position approximately midway along the motor coach. The passenger in the wheelchair is then located in an open floor area aligned with the lift and is maintained in that area during travel. The open floor area necessary for the wheelchair of course again limits the number of passenger seats which can otherwise be accommodated. In addition the open floor area for the passenger in the wheelchair is spaced from the lavatory compartment located at the rear of the motor coach thus preventing the passenger in the wheelchair from reaching the lavatory compartment along the conventional very narrow aisle which is provided between the passenger seats.

It has also been proposed to locate the wheel chair lift at the rear of the coach just behind the rear wheels and one example of this is shown in a brochure of KOS BV from Holland. In this arrangement however there is no lavatory so that the cooperation of the lift and that portion of the floor to which the lift extends with the lavatory is not considered.

In another arrangement, it has been proposed to locate the wheelchair lift behind the rear wheels with the lift cooperating with a portion of the floor which is inside the lavatory. In this arrangement, the lavatory must be of significantly increased size to accommodate the normal lavatory functions, when the wheelchair is not in place, and to provide a portion of the floor in front of the lavatory which can accommodate the wheelchair. This arrangement has achieved little success since it requires a very large lavatory area thus reducing regular passenger seating and since the lavatory becomes inaccessible to passengers when the wheelchair is in place.

SUMMARY OF THE INVENTION

It is one object of the present invention therefore to provide an improved layout of the motor coach which provides both a wheelchair lift and a lavatory and which better accommodates the passenger in the wheelchair while allowing access to the lavatory compartment by the regular passengers and by the person in the wheelchair and while minimizing the floor area utilized for the wheelchair passenger and the lavatory compartment.

It is a further object of the present invention to provide an improved layout of a lavatory for the motor coach which can allow it to be used with a wheelchair lift if required.

According to one aspect of the invention there is provided a motor coach comprising: a coach body having two side walls, a roof, a floor spaced downwardly from the roof and located between the side walls for receiving passengers in a passenger compartment defined above the floor; ground wheels mounting the coach body for movement across the ground including at least one pair of front wheels and at least one pair of rear wheels; a plurality of passenger seats located in the passenger compartment; a lavatory compartment located in the passenger compartment at a junction between the rear wall and one side wall, the lavatory compartment having a first wall generally parallel to and spaced from said one side wall and a door which in a closed position is generally parallel to and spaced from said rear wall; a portion of the floor immediately forward of the door of the lavatory compartment on which passenger seats can be moved so as to form a portion which is free from passenger seats; and a wheel chair lift mounted at said one side wall and operable to lift a passenger in a wheel chair from the ground alongside the coach at said one side wall for movement onto said portion of the floor.

According to a second aspect of the invention there is provided a motor coach comprising: a coach body having two side walls, a roof, a floor spaced downwardly from the roof and located between the side walls for receiving passengers in a passenger compartment defined above the floor; ground wheels mounting the coach body for movement across the ground including at least one pair of front wheels and at least one pair of rear wheels; a plurality of passenger seats located in the passenger compartment; a lavatory compartment located in the passenger compartment at a junction between the rear wall and one side wall wherein the lavatory compartment has a first wall generally parallel to said one side wall spaced part way across the passenger compartment, a second wall along said one side wall, a third wall along the rear wall, the first wall having a first vertical doorway edge and the second wall having a second vertical doorway edge spaced forwardly of the rear wall, the first and second vertical doorway edges defining a doorway opening therebetween, and door means for closing the doorway opening, the door means including a first openable door panel and a second openable door panel arranged such that the first door panel can be opened independently of the second door panel to allow a partial opening only in the doorway opening and both the first and second door panels can be opened to allow a full opening of the doorway opening.

One embodiment of the invention will now be described in conjunction with the accompanying drawings in which:

BRIEF DESCRIPTION OF THE DRAWINGS

FIG. 7 is a side elevational view of the coach showing the seats moved to the position of FIG. 2.

In the drawings like characters of reference indicate corresponding parts in the different figures.

DETAILED DESCRIPTION

Figure 1:
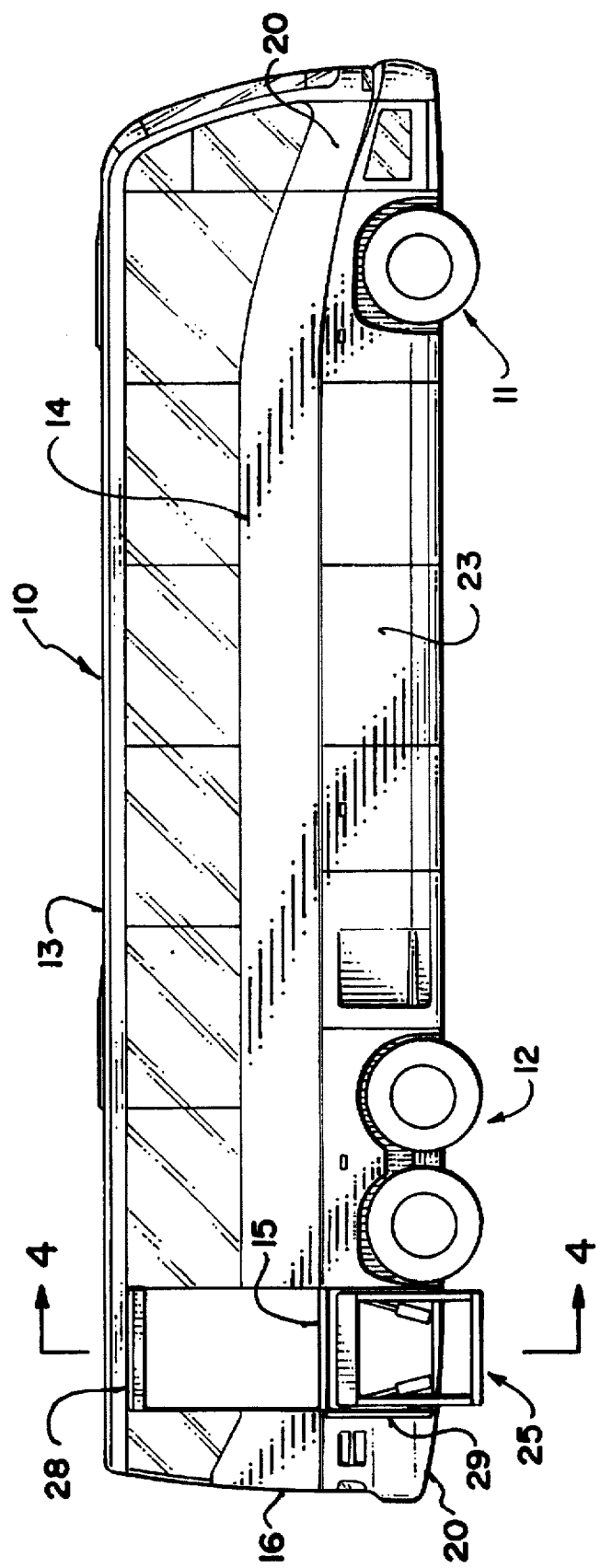
FIG. 1 is a side elevational view of a motor coach according to the present invention showing the location of the wheelchair lift in a lowered position.

A conventional motor coach is shown in FIG. 1 including a coach body generally indicated at 10 mounted on ground wheels including a front pair of ground wheels 11 and rear ground wheels 12. The coach body includes a coach roof 13 and two coach sides 14. A floor 15 is located between the sides and forwardly of a rear wall 16 so as to define above the floor a passenger compartment 17 including two rows of seats 18 divided by an alleyway 19 so that the passengers can move from a door 20 at a front of the coach along the alleyway to take up seated positions in the seats 18.

The coach as shown is of the type generally utilized for highway transportation or touring so that the floor 15 is raised relatively high and above the ground wheels 11 and 12. At the rear of the coach just forwardly of the rear wall 16 and underneath the floor 15 is provided an engine compartment 20 containing an engine 21 and associated components shown only schematically. The engine compartment is defined rearwardly of the rear wheels by a bulkhead 22. The axles and support system therefore mounting the wheels 12 and the transmission driving the wheels 12 is not shown as this will be well known to one skilled in the art.

Forwardly of the ground wheels 12 under the floor 15 is provided a luggage compartment 23 again of a conventional construction.

The coach further includes a wheelchair lift generally indicated at 25 which operates to lift a person in a wheelchair from the ground on one side of the coach up onto the floor 15 for transportation of that person in the wheelchair in the coach.

The coach yet further includes a lavatory compartment generally indicated at 26 for use by passengers, the lavatory compartment being located at one rear corner of the coach at one side wall 14 and at the rear wall 16.

In the coach as shown in the drawings, the lift mechanism 25 and the lavatory compartment 26 are arranged so as to cooperate to assist in improving the suitability of the coach for transporting wheelchair passengers while minimizing the amount of space lost to conventionally seated passengers by the wheelchair modifications.

This is achieved by providing an area of the coach immediately forward of the lavatory compartment 26 having a floor area 27 on which the seats 18A and 18B can slide forwardly to a position closely behind a fixed seat 18C to render the floor area 27 open and free for receiving the wheelchair passenger. This area of the coach extends across from the side wall 14 into the aisle 19. The dimensions of the area 27 are therefore approximately 5 feet across the coach and 4 feet longitudinally of the coach. It will be noted from a comparison of FIGS. 2 and 6 that the sliding seats 18A and 18B move from the normal position in which the back of the rear seat 18A is against the lavatory door and the seats are normally spaced for seated passengers to a folded position in which the seats have the seat bottom folded upwardly to reduce the dimensions of the seat in the longitudinal direction of the coach so that the seats can no longer be used by seated passengers.

Also if required, the seats on the opposed side of the coach can be moved to accommodate a wheelchair lift and loaded wheelchair passenger. Thus the rearmost seat 18D at the rear of the coach remains fixed but the next seat 18E moves rearwardly and the bottom folds upwardly to leave the required 4 feet space in front of the seat 18E and behind the fixed seat 18F.

The wheelchair lift 25 is of a conventional type available commercially.

Figure 2:
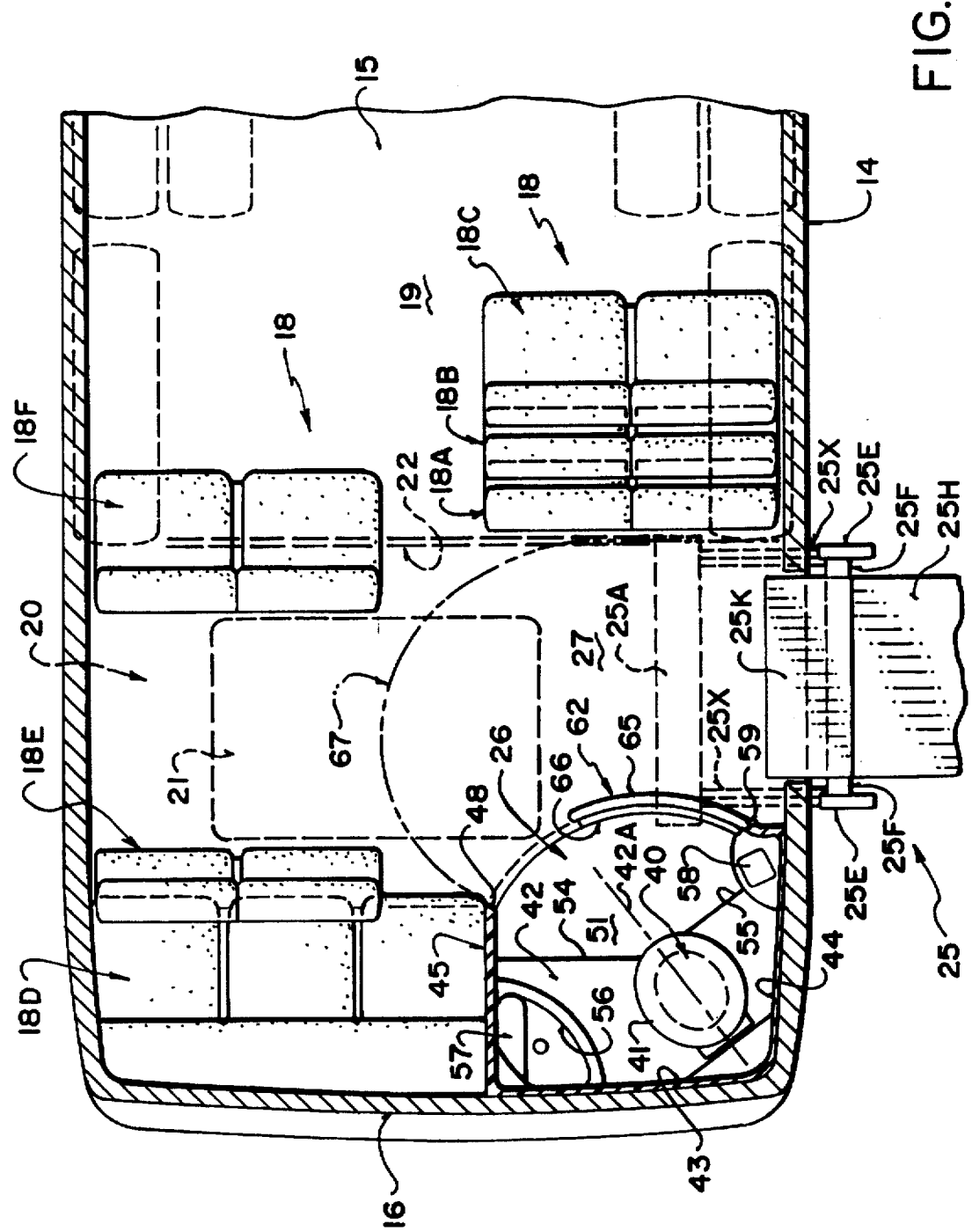
FIG. 2 is a plan view of the motor coach of FIG. 1 showing only the rear section and with the roof removed to expose the layout of the interior elements of the motor coach, with the passenger seating in the area of the lavatory and wheelchair lift moved aside to allow loading of a wheelchair passenger.
Figure 4:
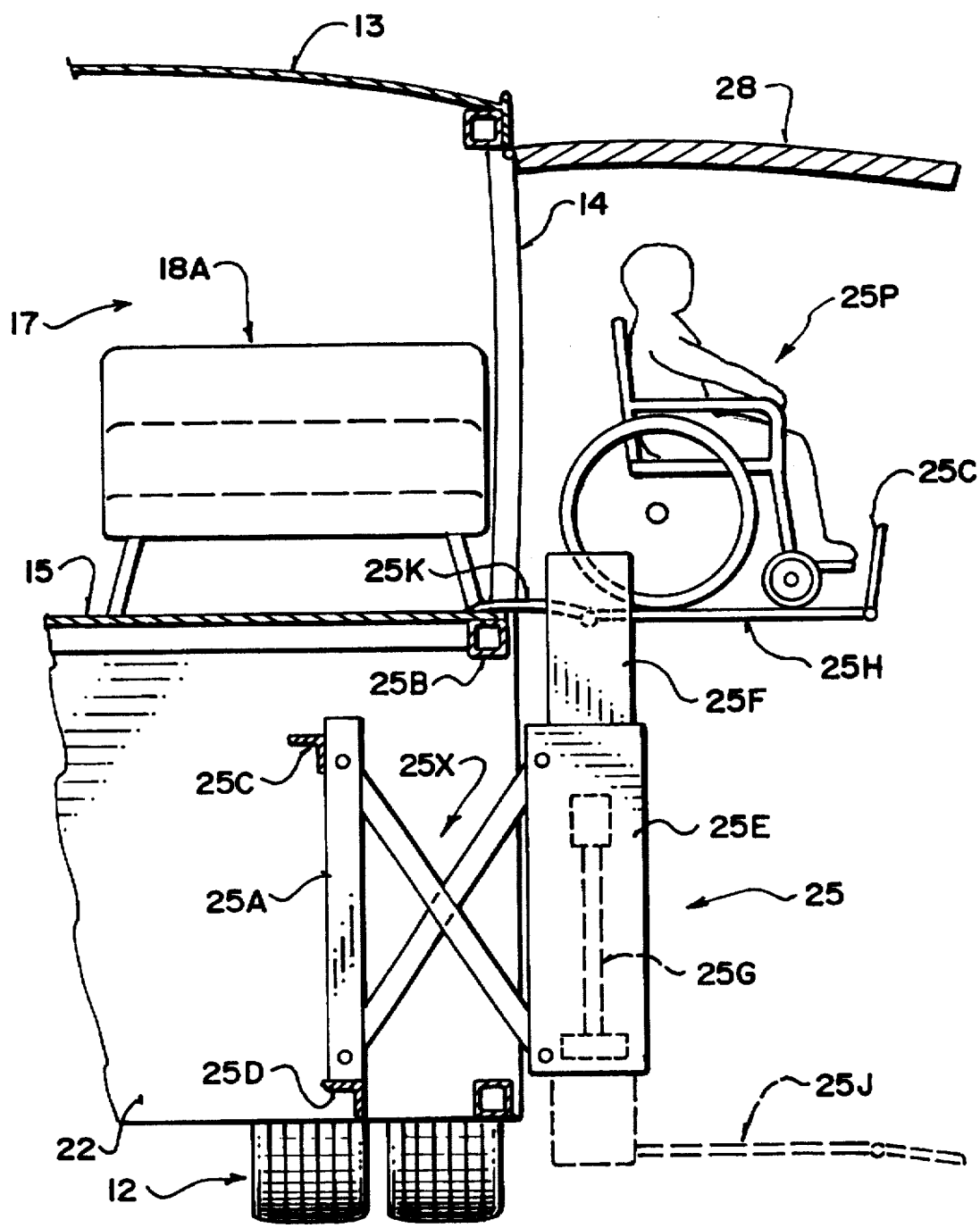
FIG. 4 is a vertical cross sectional view along the lines 4—4 of FIG. 1.

As shown best in FIGS. 2 and 4, the wheelchair lift comprises a main rectangular frame 25A mounted inside the rear compartment inwardly of an outside wall 25B of the coach. The frame 25A stands in a vertical plane and is mounted on suitable frame elements 25C and 25D of the coach structure. The frame 25A carries a main lift tower 25E which is movable inwardly and outwardly of the coach side from an extended position shown in FIG. 4 to a retracted position along side of the frame 25A. This movement is effected by a scissor-lift arrangement 25X shown only schematically which holds the tower 25E in a vertical orientation and moves the tower inwardly and outwardly by way of hydraulic or electric actuators (not shown). The tower 25E carries a vertically movable platform support element 25F which can be moved vertically by an actuator schematically indicated at 25G. The support 25F carries a platform 25H and allows movement of the platform vertically from a lowered position shown at 25J to the raised position shown at 25H. The platform carries pivotal platform elements 25K and 25L which can form extensions of the platform for engaging the ground in the lower position now for engaging onto the floor of the coach in the raised position. The platform 25H can be pivoted vertically to lie along side or within the area of the tower section 25E. In this way the whole of the wheelchair lift can be retracted inside the side wall of the coach by lifting the platform to the raised position and by retracting the scissors lift 25X. As shown in FIG. 2, the tower 25E comprises the two tower elements 25F each arranged on a respective side of the platform 25H and similarly the scissors lift portions 25X comprise two portions each arranged at a respective one of the tower portions.

From the retracted position (not shown), the tower is moved outwardly beyond the side wall of the coach, the platform is deployed and the lift section 25F is actuated to move the platform upwardly and downwardly to provide a lifting action for the person in the wheelchair generally indicated at 25P.

The wheelchair lift is conventionally mounted on the frame of the coach but instead of mounting in the luggage compartment as is conventional, instead the wheelchair lift is mounted in the engine compartment rearward of the wheels 12. This is achieved by a minor reorganization of the elements of the engine compartment so as to leave sufficient space in the engine compartment for the construction of the lift.

Instead therefore of the wheelchair lift being located approximately midway along the coach, the wheelchair lift is instead located at the rear immediately in front of the lavatory compartment so as to cooperate with the floor space 27 thus lifting a wheelchair occupant directly onto the space 27 for travel in that area. The coach is provided with suitable opening panels 28 and 29 for cooperation with the lift mechanism 25. Thus the panel 28 as shown in FIG. 1 and in FIG. 4 is mounted on a horizontal hinge at the roof line for lifting upwardly and outwardly of the coach side to provide an opening with which the lift 25 cooperates. The door panel 29 is mounted in the lower part of the coach work side covering the lift mechanism itself when in retracted position.

Generally in operation, therefore, the lift mechanism operates to lift the platform from a ground position at which the wheelchair occupant can be moved onto the platform to the raised position aligned with and cooperating with the floor 15 to allow the wheelchair occupant to wheel from the platform onto the floor for travel within the coach construction.

The floor area 27 can include tie downs for locating and holding the wheels of the wheelchair to prevent movement of the wheelchair during transportation.

Figure 3:
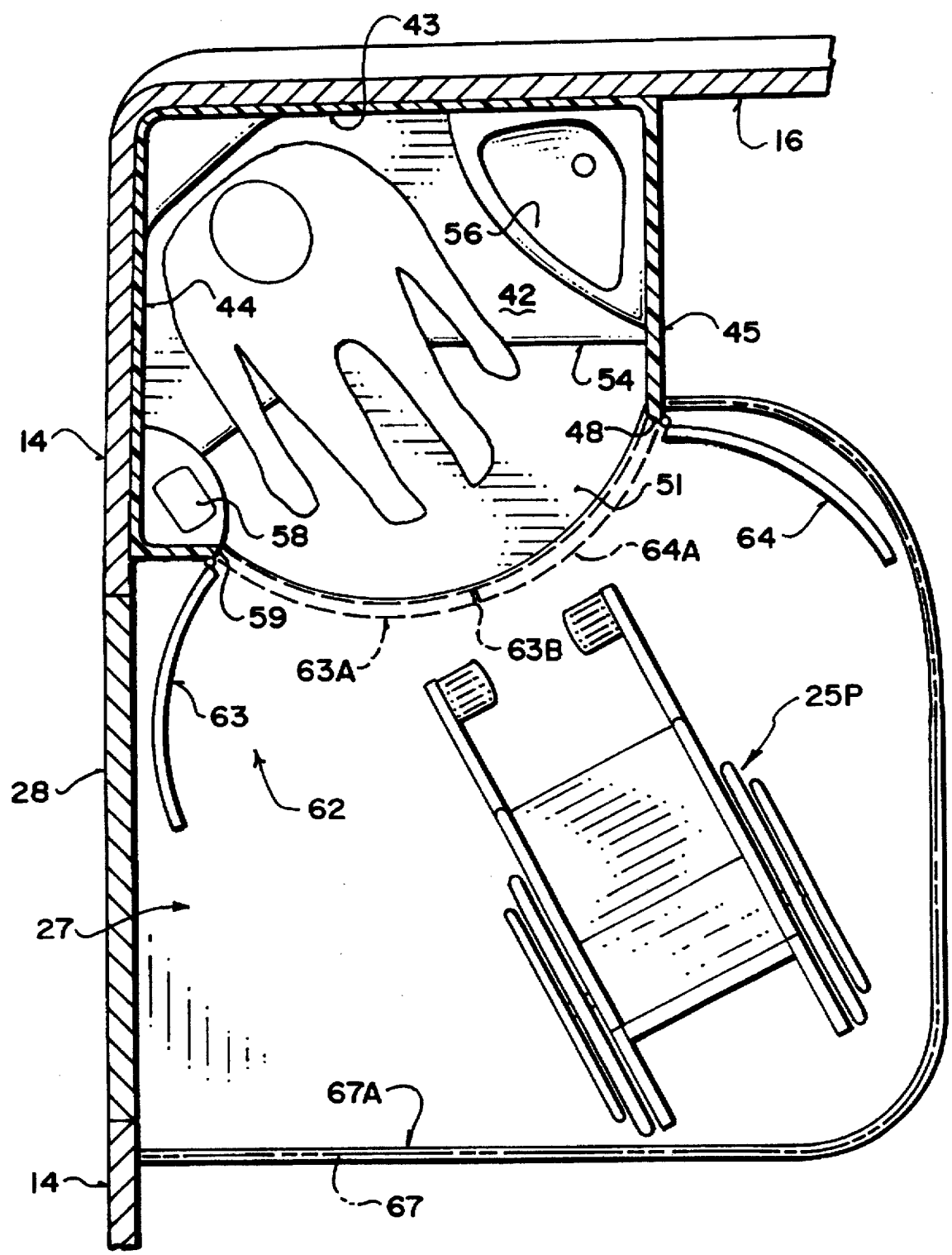
FIG. 3 is a view similar to that of FIG. 2 on an enlarged scale showing the lavatory in use by a person using a wheelchair.
Figure 5:
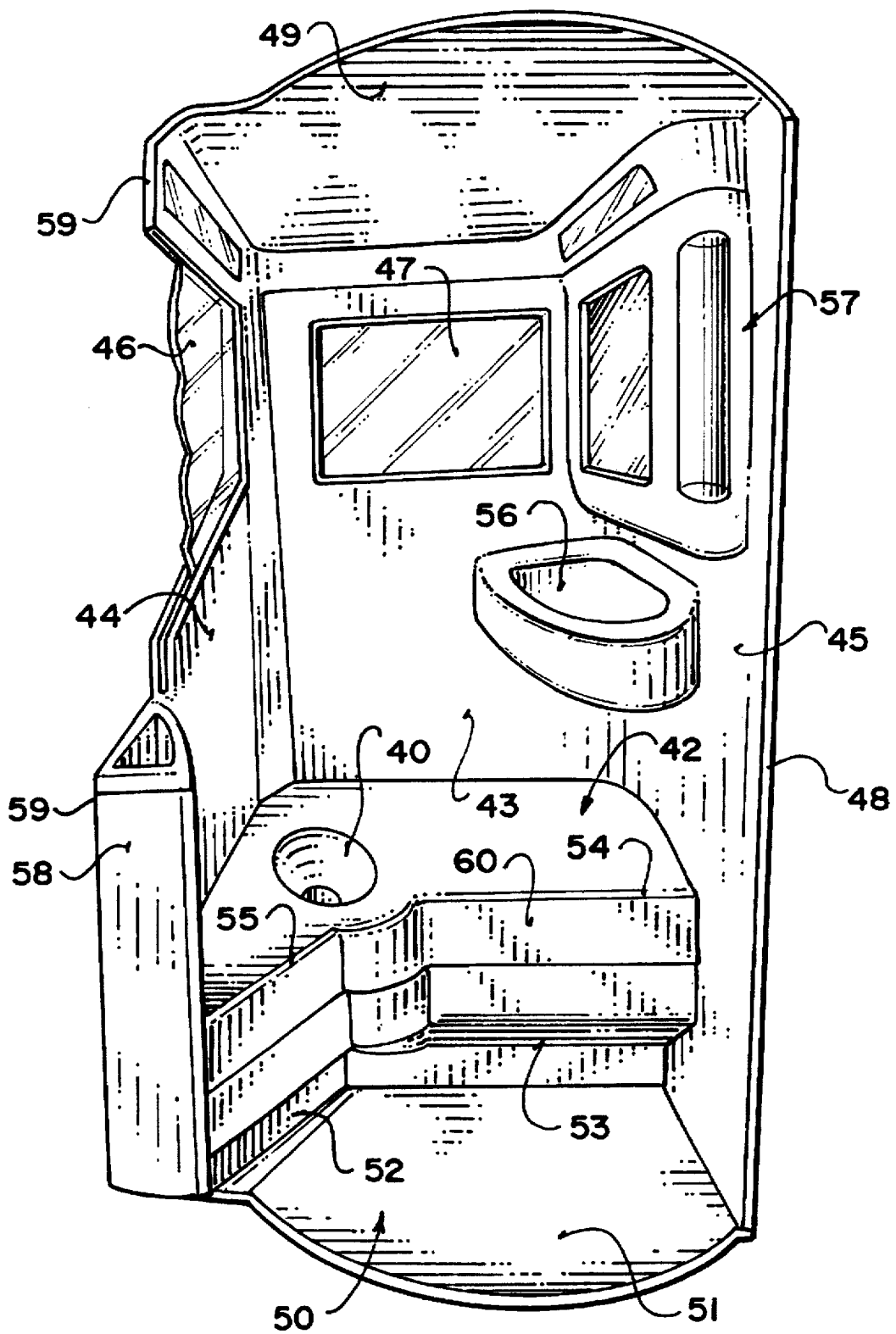
FIG. 5 is a perspective view showing the interior of the lavatory compartment of the motor coach of FIG. 1.

The lavatory compartment is shown in more detail in FIGS. 2, 3 and 5 and is modified so that it is usable by able bodied passengers and by wheelchair passengers.

The lavatory compartment therefore comprises a commode 40 covered by a seat 41. The commode 40 forms part of a molded plastics bench structure 42. The walls of the compartment are formed from molded plastics defining a rear wall 43, a first side wall 44 and a second side wall 45. The side wall 44 contains a window 46 aligned with but smaller than the conventional exterior window of the coach body. The window is suitably tinted for privacy. The side wall 44 is attached to the wall 14. The rear wall 43 is similarly attached to the rear wall 16 of the coach and also contains a window 47 aligned with but smaller than the rear window (not shown) of the coach. The side wall 45 extends at right angles to the rear wall 43 and the rear wall 16 of the coach body and forms a vertical panel terminating in a front edge 48 of the wall 45. The side walls 44 and 45 and the rear wall 43 are integrally molded with a ceiling 49 from a suitable plastics material such as fiberglass or vacuum formed acrylic to provide a structural compartment which can be mounted inside the coach body. A second component of the compartment is defined by a floor and kick panel element 50 which is again similarly molded and includes a floor panel 51 shaped to match the floor defined inside the compartment formed by the walls 43, 44 and 45 and including a kick panel which extends vertically upwardly at one side 52 and at a rear 53 to cooperate with the walls 43 and 44 respectively.

The commode 40 and bench 42 are formed as a third component of the compartment. The bench extends across the rear of the compartment in a first portion interconnected with the wall 45 and having a front edge 54 parallel to the wall 43. From the wall 45, the front edge 54 extends at right angles to the wall 45 to a position just forward of the commode 40. The front edge includes a second portion 55 extending from the position just forward of the commode diagonally to the front of the wall 44. The bench extends horizontally from the front edge 54, 55 to the rear wall and to the side wall. A center line of symmetry indicated at 40A of the commode 40 is arranged to substantially intersect with the junction between the rear wall 43 and the side wall 44 and to extend therefrom at an angle of the order of 45° outwardly from the corner or intersection. This presents the seating position on the commode as shown in FIG. 3 so that the seated user of the commode faces outwardly from the corner diagonally in toward the center of the coach.

A sink 56 is molded into the structure of the rear wall 43 and the side wall 45 at the junction therebetween. A storage cabinet and mirror assembly 57 is integrally molded with or mounted on the side wall 45 above the sink. A trash compartment 58 is molded into or attached to the side wall 44.

The side wall 44 includes an edge 59 defining an outermost edge of the compartment. As shown in FIGS. 2 and 3, the edge 59 is located at a position spaced slightly inwardly from the side wall 14 at the inner edge of the molding forming the garbage container 58.

The bench 42 includes a downturned front wall 60 at the edges 54, 55 which cooperates with an upper edge of the rear kick panel section 52, 53.

The area defined underneath the ceiling 49 and between the edges 48 and 59 defines a doorway through which a user can pass to utilize the lavatory compartment. The doorway is closed by a door construction generally indicated at 62. The door construction 62 is formed of two door panels which can be opened independently.

In the construction shown in FIG. 3, the door panels are indicated at 63 and 64 and are arranged as a clam shell arrangement. Thus the door 63 is pivotally connected along the edge 59 and the door 64 is pivotally connected to the edge 48. Thus these doors can move to a fully open position shown in FIG. 3 in which each door pivots outwardly to leave the whole of the doorway open. However the door 63 can also be moved to a closed position indicated at 63A and can be held in that position while the door 64 can be moved from the open position to a closed position indicated at 64A. Thus the door 64 can be operated independently and the doorway section defined between an edge 63B of the closed door 63A and the edge 48 provides a sufficient area for an able bodied passenger to pass into the compartment behind the seat 18A as best shown in FIG. 6 for utilizing the equipment.

Figure 6:
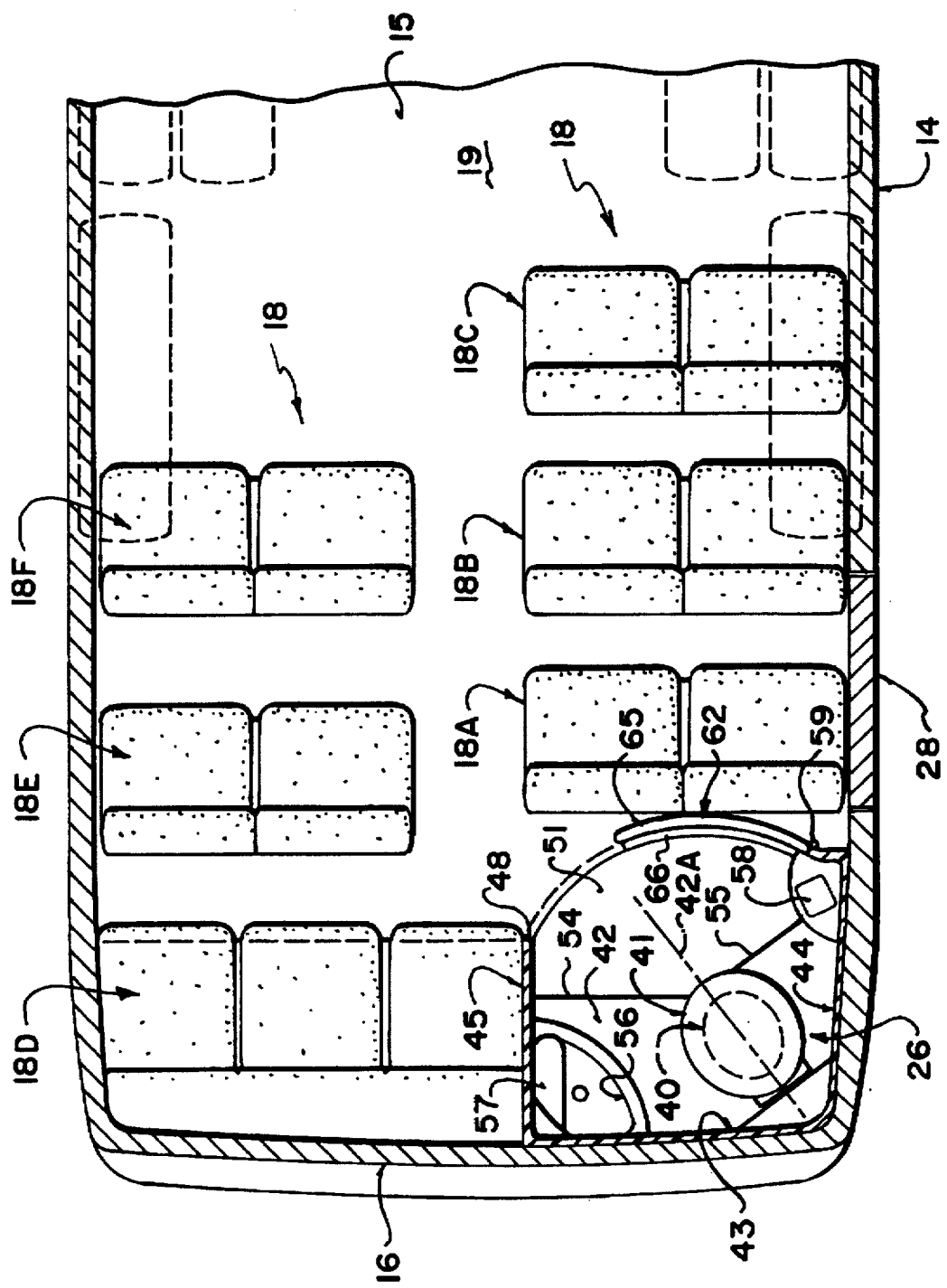
FIG. 6 is a plan view similar to FIG. 2 showing the passenger seats returned to the normal position.

In the modified arrangement shown in FIGS. 2 and 6, the door 62 comprises a first panel 65 which corresponds to the panel 63 and is pivotally connected at the edge 59. However the door construction further includes a second panel 66 which is slidably mounted on the first panel 65 so it slides from a closed position abutting the edge 48 to an open position inside the door panel 65. Again, however, the door construction 62 operates so that able bodied passengers simply operate the door panel 64 or 66 to provide an opening between the edge 48 and an edge of the door panel 63, 65 and wheelchair passengers can open the door fully to provide a full opening defined by the doorway between the edges 48 and 59.

A further component of the lavatory compartment comprises a curtain track 67 which extends from the wall 14 at the forward most position of the floor area 27 behind the rear most seat 18A in a direction generally across the coach to the opposite side of the aisle and then rearwardly to meet a position at the edge 48. The curtain track is of course mounted at the ceiling or roof the coach so as to support a curtain 67A suspended from the curtain track from the ceiling to a position at or closely adjacent the floor 15.

Normally the curtain 67A is stored at one end of the track so as to leave the interior of the coach open for movement of the seats 18A and 18B to the deployed position. However when the seats have been moved to the retracted position and a wheelchair passenger loaded onto the area 27 wishes to use the lavatory compartment, the wheelchair passenger or an assistant can move the curtain to the closed position bounding the area 27 and the compartment 26. This allows the wheelchair passenger to open the doors 62 to the fully opened position shown in FIG. 3 while the wheelchair passenger is maintained separate and private from the remaining passengers by the curtain 67A on the track 67. The wheelchair passenger can then effect a transfer from the wheelchair to the commode or can carry out other ablutions as required.

When the wheelchair passenger has completed their ablutions, the curtain can be opened and the wheelchair removed to a position at one side 14 of the coach and immediately forwardly of the closed panel of the door thus leaving the part of the area 27 adjacent the aisle and forwardly of the door panel 64 open for normal movement of passengers along the aisle to the lavatory compartment.

The positioning of the wheelchair lift immediately forwardly of the lavatory compartment therefore allows the area 27 to be used both for loading of the wheelchair passenger and as an adjunct to the lavatory compartment thus minimizing the space requirement for the wheelchair passenger while allowing that wheelchair passenger full and proper access to the lavatory compartment.

In order to accommodate the wheelchair lift 25, the storage tank for the commode 40 is modified to a low height, long rectangular tank 40A shown in FIG. 7 which is located underneath the wheelchair lift 25 along the bottom of the coach frame adjacent that side wall containing the wheelchair lift. Thus the commode 40 includes a primary storage tank 40B which is connected via a pipe 40C to the horizontal lower storage tank 40A at the bottom of the coach frame.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A motor coach comprising:
   a coach body having two side walls, a roof, a floor spaced downwardly from the roof and located between the side walls for receiving passengers in a passenger compartment defined above the floor;
   ground wheels mounting the coach body for movement across the ground including at least one pair of front wheels and at least one pair of rear wheels;
   a plurality of passenger seats located in the passenger compartment;
   a lavatory compartment located in the passenger compartment at a junction between the rear wall and one side wall, the lavatory compartment having a first wall generally parallel to and spaced from said one side wall and a door which in a closed position is generally parallel to and spaced from said rear wall;
   a portion of the floor immediately forward of the lavatory compartment having passenger seats thereon, which passenger seats can be moved forwardly away from the lavatory compartment so as to leave said portion immediately forward of the lavatory compartment free from passenger seats;
   and a wheel chair lift mounted at said one side wall and operable to lift a passenger in a wheel chair from the ground alongside the coach at said one side wall for movement onto said portion of the floor immediately forward of the lavatory compartment;
   said door being shaped and arranged such that the lavatory compartment is accessible through the door by able-bodied passengers with the passenger in the wheelchair on said portion and such that the lavatory compartment is accessible through the door by the passenger in the wheelchair from said portion.

2. A motor coach according to claim 1 including a rear compartment beneath the floor at the rear wall for containing the engine and including a luggage compartment forwardly of the engine, wherein the lift is mounted in the rear compartment.

3. A motor coach according to claim 1 wherein the rear wheels are located forwardly of the rear compartment and wherein the lift is arranged rearwardly of the rear ground wheels.

4. A motor coach comprising:
   a coach body having two side walls, a roof, a floor spaced downwardly from the roof and located between the side walls for receiving passengers in a passenger compartment defined above the floor;
   ground wheels mounting the coach body for movement across the ground including at least one pair of front wheels and at least one pair of rear wheels;
   a plurality of passenger seats located in the passenger compartment;
   a lavatory compartment located in the passenger compartment at a junction between the rear wall and one side wall, the lavatory compartment having a first wall generally parallel to and spaced from said one side wall and a door which in a closed position is generally parallel to and spaced from said rear wall;
   a portion of the floor immediately forward of the lavatory compartment having passenger seats thereon, which passenger seats can be moved forwardly away from the lavatory compartment so as to leave said portion immediately forward of the lavatory compartment free from passenger seats;
   and a wheel chair lift mounted at said one side wall and operable to lift a passenger in a wheel chair from the ground alongside the coach at said one side wall for movement onto said portion of the floor immediately forward of the lavatory compartment;
   said door being shaped and arranged such that the lavatory compartment is accessible through the door by able-bodied passengers with the passenger in the wheelchair on said portion and such that the lavatory compartment is accessible through the door by the passenger in the wheelchair from said portion;
   wherein the lavatory compartment has a second wall along said one side wall, a third wall along the rear wall, said first wall being generally parallel to the second wall and spaced part way across the passenger compartment, the first wall having a first vertical doorway edge and the second wall having a second vertical doorway edge spaced forwardly of the rear wall, the first and second vertical doorway edges defining a doorway opening therebetween, said door closing the doorway opening, the door including a first openable door panel and a second openable door panel said door panels being arranged such that the first door panel can be opened independently of the second door panel to allow a partial opening only in the doorway opening at a position spaced from said one side wall so as to be accessible by the able-bodied passengers with the passenger in the wheelchair on said portion and both the first and second door panels can be opened to allow a full opening of the doorway opening so as to be accessible from the portion by the passenger in the wheelchair.

5. The motor coach according to claim 4 wherein both the first and second door panels are convexly curved outwardly of the lavatory compartment.

6. The motor coach according to claim 5 wherein the first and second door panels intersect to form a smooth contiguous curve.

7. The motor coach according to claim 4 wherein each of the first and second door panels is hingedly connected at a respective one of the first and second doorway edges to form a clamshell arrangement with the first and second door panels having free edges meeting at a vertical contact line part way across the doorway opening.

8. The motor coach according to claim 1 wherein the lavatory compartment includes a commode located closely at the junction between the rear wall and said one wall with a horizontal central axis of symmetry of the commode substantially intersecting the junction and extending outwardly therefrom at an angle of the order of 45 degrees relative to said one side wall and the rear wall.

9. A motor coach comprising:

a coach body having two side walls, a roof, a floor spaced downwardly from the roof and located between the side walls for receiving passengers in a passenger compartment defined above the floor;

ground wheels mounting the coach body for movement across the ground including at least one pair of front wheels and at least one pair of rear wheels;

a plurality of passenger seats located in the passenger compartment;

a lavatory compartment located in the passenger compartment at a junction between the rear wall and one side wall, the lavatory compartment having a first wall generally parallel to and spaced from said one side wall and a door defining a first closure member which in a closed position is spaced from said rear wall;

a portion of the floor immediately forward of the lavatory compartment having passenger seats thereon, which passenger seats can be moved forwardly away from the lavatory compartment so as to leave said portion immediately forward of the lavatory compartment free from passenger seats;

a wheel chair lift mounted at said one side wall and operable to lift a passenger in a wheel chair from the ground alongside the coach at said one side wall for movement onto said portion of the floor immediately forward of the lavatory compartment;

said door being shaped and arranged such that the lavatory compartment is accessible through the door by able-bodied passengers with the passenger in the wheelchair on said portion and such that the lavatory compartment is accessible through the door by the passenger in the wheelchair from said portion;

and a second closure member operable for movement between an open position, in which access is allowed by said second closure member for able-bodied passengers to the lavatory compartment, and a closed position, in which the closure member acts to divide said portion and the lavatory compartment from a remaining part of the passenger compartment while allowing access by the passenger in the wheelchair to the lavatory compartment.

10. The motor coach according to claim 9 wherein the second closure member comprises a curtain on a track.

11. The motor coach according to claim 9 wherein the lavatory compartment has a second wall along said one side wall, a third wall along the rear wall, said first wall being generally parallel to the second wall and spaced part way across the passenger compartment, the first wall having a first vertical doorway edge and the second well having a second vertical doorway edge spaced forwardly of the rear wall, the first and second vertical doorway edges defining a doorway opening therebetween, said door closing the doorway opening, the door including a first openable door panel and a second openable door panel, said door panels being arranged such that the first door panel can be opened independently of the second door panel to allow a partial opening only in the doorway opening at a position spaced from said one side wail so as to be accessible by the able-bodied passengers with the with the passenger in the wheelchair on said portion and both the first and second door panels can be opened to allow a full opening of the doorway opening so as to be accessible from the portion by the passenger in the wheelchair.

12. The motor coach according to claim 11 wherein both the first end second door panels are convexly curved outwardly of the lavatory compartment.

13. The motor coach according to claim 12 wherein the first and second door panels intersect to form a smooth contiguous curve.

14. The motor coach according to claim 11 wherein each of the first and second door panels is hingedly connected at a respective one of the first and second doorway edges to form a clamshell arrangement with the first and second door panels having free edges meeting at a vertical contact line part way across the doorway opening.

* * * * *